United States Patent [19]

McEwen

[11] Patent Number: 4,469,256

[45] Date of Patent: Sep. 4, 1984

[54] COVER APPARATUS WITH DETACHABLE COMPARTMENTS

[76] Inventor: Jerry J. McEwen, 3536 Clay St., Denver, Colo. 80211

[21] Appl. No.: 518,389

[22] Filed: Jul. 29, 1983

[51] Int. Cl.³ .................................................. B62J 7/00
[52] U.S. Cl. ................................ 224/32 R; 224/32 A; 280/289 A
[58] Field of Search ...................... 224/32 R, 35, 32 A, 224/33 R; 280/289 A

[56] References Cited

U.S. PATENT DOCUMENTS

| | | | |
|---|---|---|---|
| 4,059,207 | 11/1977 | Jackson et al. | 224/31 |
| 4,068,859 | 1/1978 | Dittman | 224/32 R X |
| 4,303,184 | 12/1981 | Kloth | 224/32 R |
| 4,345,703 | 8/1982 | Allen | 224/32 A |
| 4,359,233 | 11/1982 | Jackson et al. | 224/32 R X |

FOREIGN PATENT DOCUMENTS

| | | | |
|---|---|---|---|
| 2234173 | 1/1975 | France | 224/32 R |
| 877460 | 9/1961 | United Kingdom | 224/32 R |

OTHER PUBLICATIONS

Eclipse Tank Bag, Cycle Magazine, pp. 64, 65, Jan., 1975.
Advertisement, "Gold Wing Tank Covers"—undated.
Advertisement, "COMPAC-1150 Modular Tank Bag System"—undated.
Advertisement, "The Eclipse Tank Bag"—undated.
Advertisement, "BMW Tank Covers"—undated.
Advertisement, "Magnetic Tank Bags"—undated.

Primary Examiner—Steven M. Pollard
Attorney, Agent, or Firm—Young & Martin

[57] ABSTRACT

A vehicle frame element cover apparatus is provided which includes a flexible shell adapted to be snugly fit about the frame element and held in proper orientation by an adjustable strap and pockets which receive portions of the frame element. Zippered slits are formed in the shell to allow convenient attachment of the cover to the frame element and, when the slits are closed, the cover is drawn taut around the frame element. Preferably, the shell is formed of an iner layer of soft material and an outer layer of durable, wear-resistant material. Removable pouches may be mounted on the shell.

17 Claims, 8 Drawing Figures

U.S. Patent  Sep. 4, 1984  Sheet 1 of 3  4,469,256
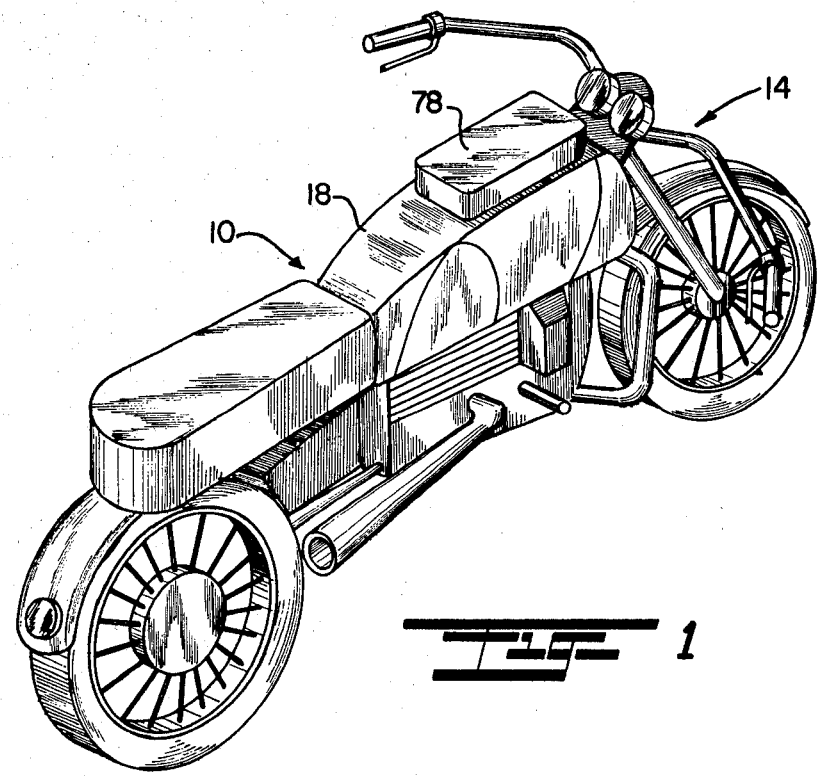
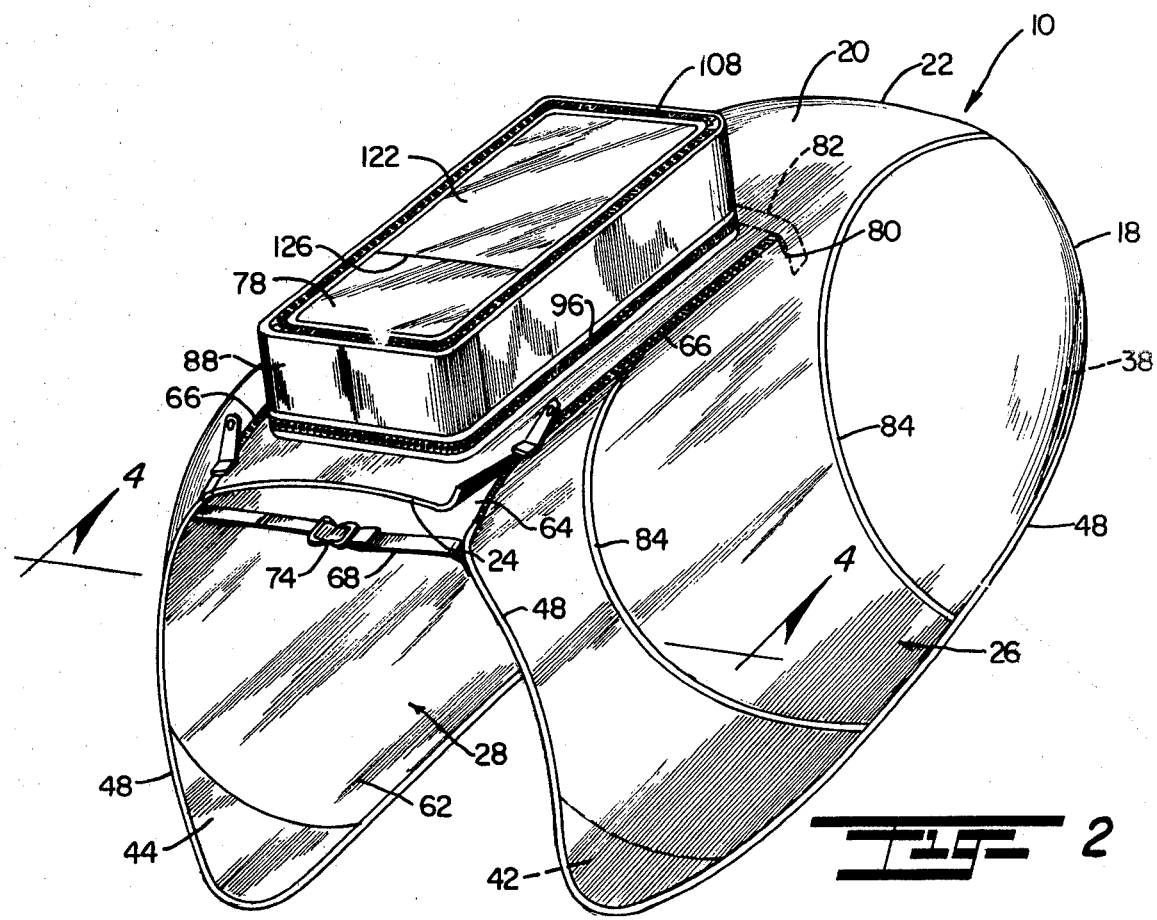

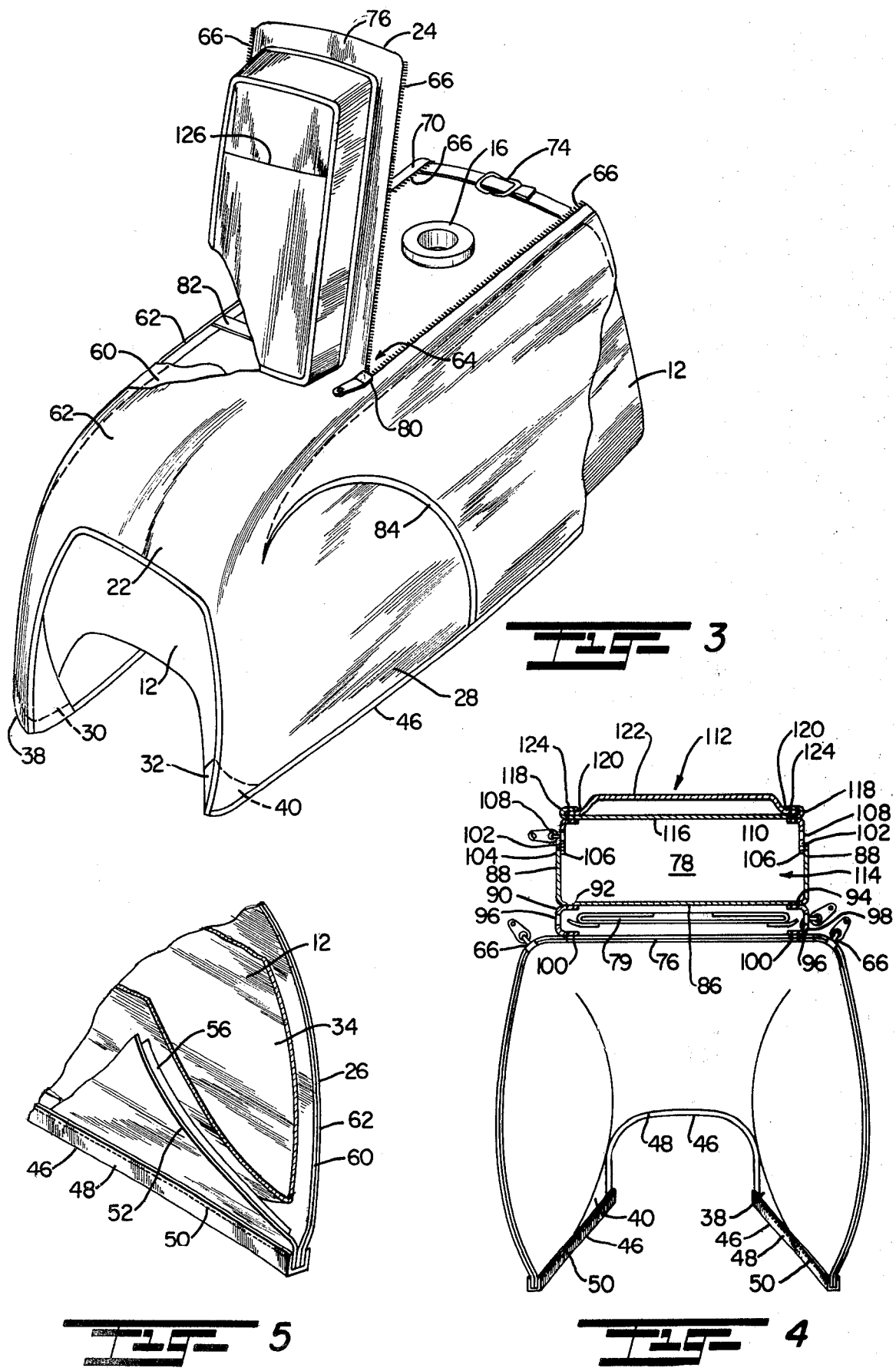

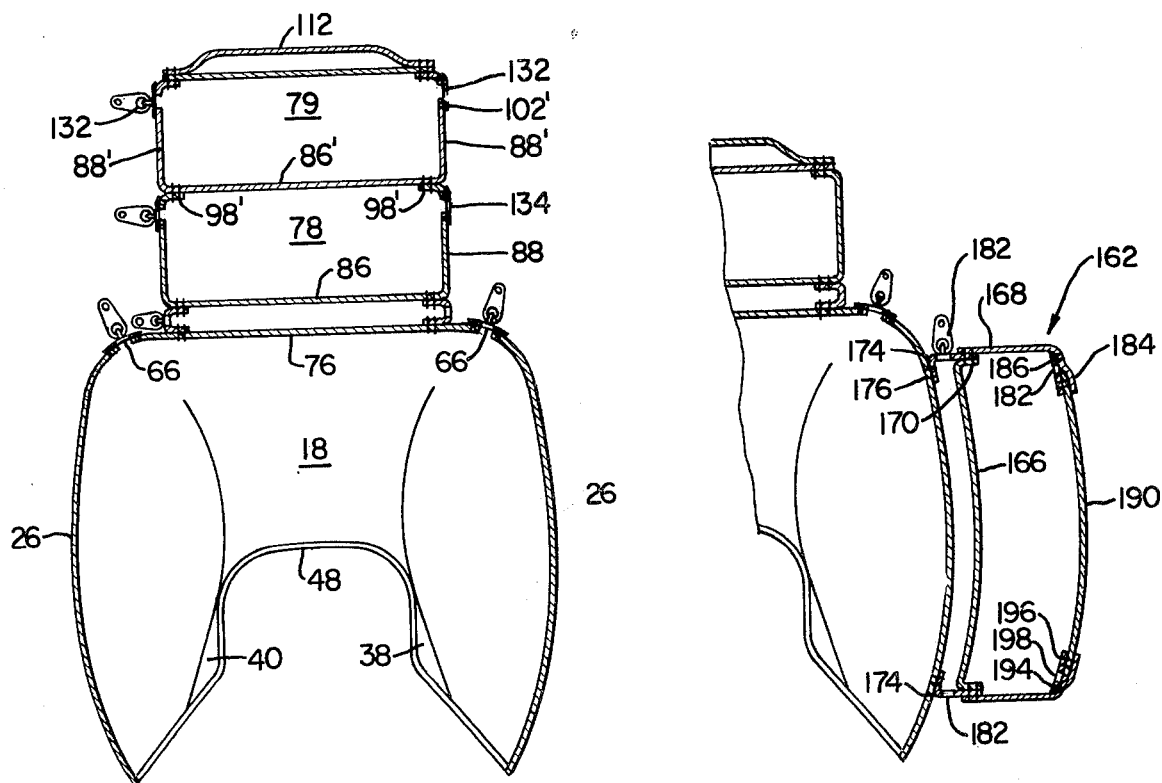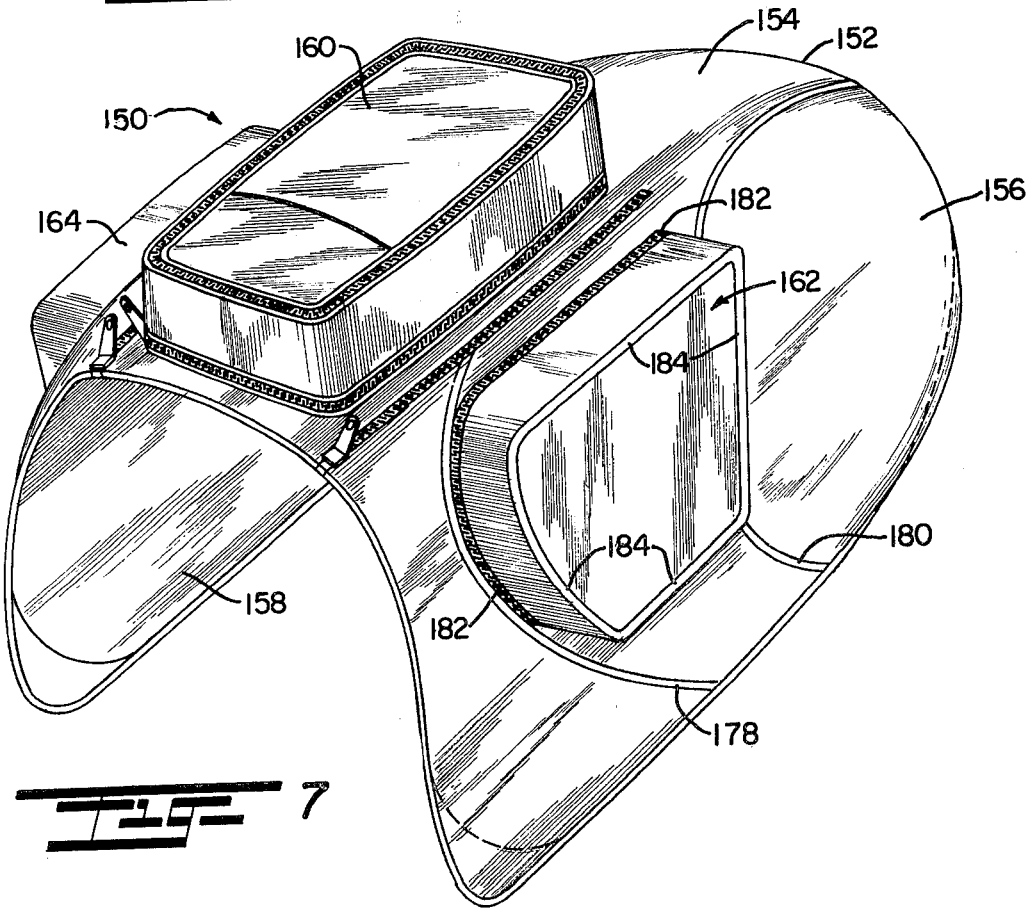

COVER APPARATUS WITH DETACHABLE COMPARTMENTS

BACKGROUND OF THE INVENTION

The present invention relates to a cover apparatus adapted to be mounted on a vehicle frame element in order to protect the frame element from scratches and other damage. The present invention also includes one or more detachable pouch compartments which are mountable to the cover so as to provide storage space for the user of the vehicle. Particularly, the present invention is adapted to be used as a covering for a motorcycle gas tank so that the gas tank is protected against scratches and mars that would be detrimental to the appearance of the gas tank.

While vehicle covers, generally, and motorcycle gas tank covers, specifically, have been known in the past, there yet remains a need for an attractive gas tank cover that is inexpensive yet easy to mount on the vehicle frame element to be protected. Such tank covers or tank bags include, for example, a motorcycle tank cover shown in U.S. Pat. No. 4,059,207 issued Nov. 22, 1977 to Jackson et al. This patent shows a storage bag attachable to a gas tank by means of a plurality of adjustable straps extending around the tank.

The Chase Harper Company of Santa Barbara, Calif., produces several different types of tank bags where an independent cover may be positioned around the motorcycle tank and mounted thereon by means of corner pockets and zippers. Independent pouches or compartments are provided with metallic O-rings so that they may be independently attached to the tank cover by means of Velcro strips, and a zippered access to the fill hole of the gas tank is provided in the cover. Other covering assemblies sold by Chase Harper utilize strap mounts similar to the Jackson et al patent, and further tank covers utilizing mounting straps are sold by Eclipse, Inc., of Ann Arbor, Mich.

While these tank bags have been successful in providing storage compartments for cyclists, and, indeed, have offered some degree of protection for the motorcycle tank, there have been inherent drawbacks in the use of attachment straps and the various fasteners used to mount the covers and bags to the gas tank. For example, it has been found that, while the cover generally protects the gas tank, the snaps sometimes cause scratches or damage to the finish on the motorcycle tank. Also, the use of cinch straps is cumbersome when the cyclist must have access to the fill spout of the tank, and, where the straps need to be detached from the motorcycle in order to reach the fill spout, a loaded tank bag can become dislodged from its position, thus requiring extra effort in remounting the cover to the tank before the motorcycle can be ridden.

There is therefore a need for a tank bag and cover which is easy and convenient to mount onto a vehicle frame element, which is versatile in use, and which does not utilize a complex or cumbersome attachment structure to secure the covering to the frame element. It is further desirable to provide a covering that is neat in appearance when mounted, for example, on a motorcycle gas tank and which provides ready access to the gas tank fill spout without requiring detachment of the cover and bag compartments.

SUMMARY OF THE INVENTION

It is an object of the present invention to provide a novel and useful cover apparatus for a vehicle frame element, such as a motorcycle gas tank, which is inexpensive in manufacture and easy to use.

It is another object of the present invention to provide a cover apparatus for a vehicle frame element that may be snugly fit on the frame element to present a pleasing appearance without the use of a complicated assembly of straps or fastening straps.

It is yet another object of the present invention to provide a motorcycle gas tank cover and storage compartment assembly wherein a tank covering that is contoured to the shape of the motorcycle gas tank may be snugly secured to that gas tank without the need for complex straps or snaps and which has detachable storage compartments or pouches that do not interfere with ready access to the fill spout of the gas tank.

It is still a further object of the present invention to provide a motorcycle tank cover with stackable and nestable storage compartments that can be secured thereon which includes a mounting and support structure that allows access to the tank fill spout without dislodging the cover while the storage compartments are secured thereon.

While the present invention is described with respect to a motorcycle gas tank cover, it should be appreciated that the preferred embodiment of the cover apparatus described herein may be utilized to cover any frame element of a vehicle that has corners or wings to which the covering may be secured. As described with respect to the preferred embodiment, though, the cover apparatus is defined by a flexible shell having inner and outer layers that are configured to overlay the frame element. The shell is contoured to the shape of the frame element so that it will snugly fit thereon. A plurality of pockets, preferably reinforced with plastic inserts, are provided along the peripheral edge of the shell and are positioned to receive the corners or wings of the frame element. With respect to a motorcycle gas tank, the pockets are formed at the lower four corners of the covering and receive the lower forward wings and lower rearward wings of the gas tank.

The fabric covering includes an inner layer of polyester pile fabric, such as a velour, while the exterior is formed out of a pack cloth that is water and wind resistent. The forward upper portion of the flexible shell is provided by at least one, but preferably two, parallel zippered slits. When the slits are open, the cover may be conveniently secured around the gas tank with the tank wings received in the corner pockets. By zippering the slits closed, the cover becomes snugly secured to the motor-cycle gas tank.

In the preferred embodiment of the invention, a detachable storage compartment is secured at the upper forward portion of the tank covering between the two parallel slits and terminates at a rearward edge forwardly of the rear end of the slits. The storage compartment is closed at the bottom but open at the top, but may be sealed by means of a zippered cover. Thus, a plurality of storage compartments can be zippered, one on top of the other, with the uppermost compartment being sealed by the cover. When not in use, all of the storage compartments may be nested beneath the cover which is directly zippered over the bag covering between the slits. Thus, access to the motorcycle gas fill spout may be obtained by unzipping the two slits regardless of whether the storage compartments are filled with personal items of the cyclist. Optional side pouches may be attached to the sides of the flexible shell, and a reinforcement strap extends across the upper, mid-portion of the flexible shell, adjacent the terminal end of the slits, to further reinforce the assembly for loading and to prevent slippage of the tank cover when the slits are unzipped.

These and other objects, advantages, and features of the present invention will become more readily appreciated and understood when taken together with the following detailed description in conjunction with the accompanying drawings, in which:

BRIEF DESCRIPTION OF THE DRAWINGS

FIG. 1 is a perspective view of a motorcycle showing the preferred embodiment of the present invention attached to the gas tank thereof;

FIG. 2 is a front perspective view of the cover apparatus for a motorcycle tank according to the preferred embodiment of the present invention;

FIG. 3 is a rear perspective view, partially broken away, of the cover shown in FIG. 2 mounted on a gas tank and with the tank access flap shown open;

FIG. 4 is a front cross-sectional view taken about lines 4—4 of FIG. 2;

FIG. 5 is a perspective view in partial cross section of a corner pocket of the tank cover;

FIG. 6 is a front cross-sectional view of the preferred embodiment of the present invention showing a plurality of detachable compartments in their extended positions;

FIG. 7 is a perspective view of an alternate embodiment of the present invention showing side pockets; and FIG. 8 is a broken cross-sectional view of the alternate embodiment shown in FIG. 7.

DETAILED DESCRIPTION OF THE PREFERRED EMBODIMENT

The present invention is directed to a cover apparatus which is adapted to mount on a vehicle frame element. While it should be appreciated that the preferred embodiment of the present invention is described with respect to a motorcycle gas tank cover, the present invention contemplates a cover for any vehicle frame element that has relatively pointed corners to which the cover may be secured, such as fenders, railing, bumpers, and the like. The preferred embodiment of the frame element cover also includes top-mounted detachable pouches that define storage compartments for personal items of the user.

As is shown in FIGS. 1 and 2, the preferred embodiment of the present invention comprises a cover apparatus or tank cover 10 shown mounted on the gas tank 12 of motorcycle 14. Gas tank 12 has a typical access opening or fill spout to allow introduction of fuel to the tank with this opening being closed by gas cap 16. Cover 10 is formed of a flexible shell 18 that is configured to overlay gas tank 12 and that is contoured to have the shape of tank 12. Shell 18 has an upper surface panel 20 which terminates at a rear edge portion 22 and a forward edge portion 24. A pair of side panels 26 and 28 form the left and right sides of shell 18, respectively, and are formed as generally continuous extensions of upper surface panel 20 and edge portions 22 and 24.

Gas tank 12 terminates at its lower four corners in relatively pointed wings, such as left rear wing 30, right rear wing 32, front left wing 34 and front right wing 36, as is shown in FIGS. 3 and 5. Wings 30, 32, 34, and 36 are received by pockets 38, 40, 42, and 44, respectively, of shell 18. Accordingly, pockets 38, 40, 42, and 44 are located on the peripheral edge 46 that extends completely around the lower portion of shell 18 and that is defined by taped seam 48 stitched to the edge of shell 18 by means of stitching 50.

As is shown in FIG. 5, each pocket, as exemplified by pocket 42, is defined by a triangular flap 52. A rigid support member in the form of plastic stay 56 is mounted on flap 52 between flap 52 and side panel 26. Wing 34 may thus be positioned between side panel 26 and stay 56 so that the corner of shell 18 is retained on wing 34.

The remaining construction of shell 18 can best be seen with reference to FIGS. 2-4 wherein it should be appreciated that shell 18 is formed as a double wall including an outer or exterior wall 60 constructed of a wear resistant material which may preferably be an eight ounce pack cloth fabric that resists both wind and water. An inner or interior wall 62 is configured similarly to exterior wall 60 and is in abutting relationship with exterior wall 60 substantially around shell 18. Interior wall 62 is formed of a wind resistant material but preferably of a soft, velour-type material such as a polyester pile fabric having pile approximately .15 centimeters thick.

Upper surface panel 20 of shell 18 includes a pair of parallel, elongated longitudinal slits 64 extending from forward edge portion 24 towards rear edge portion 22. Slits 64 are closed by plastic or nylon zippers 66, and an adjustable strap 68 extends between side panels 26 adjacent forward edge portion 24 of shell 18 and underneath panel 65 so as to interconnect upper forward corners 70 and 72 of tank cover 10. Strap 68 is closed by plastic buckle 74, but it should be understood that any convenient fastening assembly, such as Velcro, could be substituted to provide an adjustment means for strap 68.

Slits 64 and forward edge 24 define a rectangular flap or access panel 76, and a rectangular storage compartment or pouch 78 is mounted on the exterior upper surface 20 of panel 76. While the construction and attachment of pouch 78 is described below in greater detail, it should be appreciated that slits 64 terminate at zipper ends 80 which are located rearwardly of the rearward portion of pouch 78. To provide for further support of the structure, a reinforcement strap 82 extends transversely across the underside of upper surface 20 of shell 18 between zipper ends 80 as is shown in phantom in FIG. 2 and as is shown in FIG. 4.

From the above explanation, the mounting of shell 18 onto gas tank 12 can be more fully understood. In order to accomplish such mounting, zippers 66 are unzipped so as to allow panel 76 to be turned back thereby opening slits 64. Buckle 74 is unfastened so as to release or expand adjustment strap 68, and shell 18 is then placed in surrounding relationship to tank 12. With shell 18 surrounding tank 12, wings 30, 32, 34, and 36 are inserted into pockets 38, 40, 42, and 44, respectively, and adjustment strap 68 is reconnected across the upper forward portion of tank 12 and tightened to a desired degree. Since peripheral edge 46, as defined by seam 48, follows the lower contour of tank 12, and, since shell 18 is contoured to the shape of tank 12, the adjusting and buckling of strap 68 retains shell 18 on tank 12. In addition, and quite importantly from an asthetic standpoint, the closing of slits 64 by zippers 66 further tightens shell 18 about tank 12 so that, when zippers 66 are closed, shell 18 is snugly tightened about tank 12 to eliminate any wrinkles that may otherwise appear. It should thus be appreciated that, to aid in the contouring of shell 18 to tank 12, a plurality of arcuate piping 84 is sewn along side panels 26 and 28.

As noted above, a pouch 78 may be secured to the flap 76 with this construction being best shown in FIGS. 2, 4, and 6. As is shown in these Figures, a pair of pouches 78 and 79 are each constructed identically. Thus, while a description of pouch 78 is made with particularity, it should be understood that the structure of pouch 79 is the same.

Pouch 78 is made, preferably, of a flexible, wear resistant fabric and includes a bottom wall 86 and a surrounding side wall 88 which are secured to a zipper web 90 by means of stitching 92 and 94, respectively. Web 90 supports one half of a zipper 96 with the other half of zipper 96 being supported by a zipper web 98 which is secured by means of stitching 100 to panel 76. Webs 90 and 98 have a common, closed-loop shape so that they may mate and be fastened to one another by means of zipper 96. Side wall 88 of pouch 78 terminates in an upper edge 102 that is secured by stitching 104 to a zipper web 106. Web 106 supports one half of a zipper 108 with the other half of zipper 108 being mounted to a web 110.

A pouch cover 112 closes pouch 78 to define an enclosed compartment or chamber 114. Cover 112 includes top panel 116 which terminates, at its perimeter, in an upwardly reverse curved portion 118 which receives edge 120 of a top pocket panel 122. Web 110, edge portion 120, and reverse curved portion 118 are secured together by means of stitching 124. Panel 122 is transparent and extends from the rearward top edge of pouch 78 for approximately two-thirds the distance towards the forward end thereof. Thus, panel 122 and top panel 116 define a narrow pocket 126 therebetween to receive a map and the like. It should be appreciated that panel 122 could completely cover panel 116, in which case it should be slitted to allow access to pocket 126. It should further be understood, that, when pouch 78 is mounted to panel 76 by means of zipper 96, a small, rectangular chamber 128 is formed between flap 76 and bottom panel 86 of pouch 78. As is shown in FIG. 4, this chamber 128 holds pouch 79 in a stored condition.

It should further be appreciated, though, that a plurality of pouches, such as pouches 78 and 79, can be mounted on flap 76 in a stacked configuration. As is shown in FIG. 6, pouch 78 is attached to flap 76 in the manner described above. Cover 112 has been removed from pouch 78, however, and secured to the upper edge 102' of side wall 88 of pouch 79. Web 98' is secured to side wall 88 by means of zipper 134 so that bottom panel 86' of pouch 79 forms an upper cover for pouch 78. Zippers 132 and 134 are then formed of mating half zipper portions of zippers 96, 96', 108, and 108', which correspond to pouches 78 and 79, respectively. Further, it should be understood that additional pouches, such as pouches 78 and 79 could be stacked on top of the assembly shown in FIG. 6, and that other attachment, mounting, or fastening means, such as snaps or Velcro hook and loop fastening strips, could be substituted for the zippers described above without departing from the scope of this invention.

An alternate embodiment of the present invention is shown in FIGS. 7 and 8 wherein tank cover 150 is formed of a fabric shell 152 having a top surface 154 and a pair of side panels 156 and 158. It should be appreciated that the main body of shell 152 is identical to that of tank cover 10 and includes a detachable pouch 160 on upper surface 154. Tank cover 150, however, further includes a pair of side pouches 162 and 164 which are secured to side panels 156 and 158, respectively. Side pouches 162 and 164 are constructed identically, so that the construction of these side pouches will be described with respect only to side pouch 162, as is shown best in FIG. 8.

In FIG. 8, side pouch 162 includes a bottom wall 166 that has an upturned edge that is stitched to surrounding side wall 168 by means of stitching 170. A zipper web 172 is sandwiched between the upturned edge of bottom wall 166 and side wall 168 so it is stitched therebetween, also by means of stitching 170. A second zipper web 174 is sewn by means of stitching 176 to side panel 156 to define a closed loop. Stitching 176 follows the contour of side wall 156 and has a front edge that follows the arcuate shape of piping 178. A pair of upper and lower edge portions of web 174 are generally parallel to the plane of top surface 154 and a rearward edge of web 174 that is generally parallel and in spaced relation to piping 180. Zipper webs 172 and 174 carry a matable zipper 182 so that pouch 162 may be selectively attached and detached from side wall 156.

Side wall 168 terminates, at its upper edge, in a curved end portion 184 that projects generally parallel to bottom wall 166 and inwardly of pouch 162. End portion 184 is mounted to a zipper web 186 by means of stitching 188. A top cover 190 closes pouch 162 to define a closed compartment 192. Cover 190 is mounted to a zipper web 194 by means of stitching 196, and a zipper 198 is supported by webs 186 and 194 so that cover 190 may be removed from side wall 168. It should be appreciated that the inwardly turned end portion 184 overlaps zipper 198 to present a pleasing appearance when side pouch 162 is mounted upon side panel 156.

Further, it should be appreciated that both side pouches 162 and 164 may be removed from tank cover 150 by detaching zipper 182 and by detaching cover 190 from side wall 168. Cover 190 may then be secured directly to web 174, since zippers 182 and 198 are compatible, to form a small compartment that may retain bottom wall 166 and side wall 168 in a stored condition. With this construction, also, it would be possible to laterally stack a plurality of side pouches, such as pouches 162 and 164, on each side of tank cover 150 much in the manner that top pouches 78 and 79 were stacked as was shown in FIG. 6 of the preferred embodiment.

Embodiments of the present invention have been shown and described with a degree of particularity to enable a complete and full understanding of those embodiments. It should be understood, however, that the present invention involves inventive concepts defined in the appended claims, and these inventive concepts are not intended to be limited by the detailed description herein beyond that required by the prior art and as the claims are allowed. The COVER APPARATUS WITH DETACHABLE COMPARTMENTS of the present invention can take other forms and is susceptible to various changes in detail of structure without departing from the principles of this invention.

I claim:

1. Cover apparatus adapted to mount on a vehicle frame element such as a motorcycle gas tank and the like to protect the exterior surface of said frame element, comprising:

a flexible shell figured to overlay the frame element and contoured to the shape of the frame element, said shell having a peripheral edge, a forward end oriented toward the front of the vehicle, a rearward end oriented toward the rear of the vehicle, and a plurality of pockets attached thereto, said pockets sized to receive portions of said frame element in mated relation, said shell having at least one slit formed therein with said slit intersecting said peripheral edge and having a pair of side edges, said side edges of the slit including connections means for connecting said side edges together along their common length to close said slit whereby said shell may be positioned over said frame element with said pockets receiving said frame element portions when said slit is open and whereby said shell is drawn taut around said frame element when said slit is closed.

2. Cover apparatus according to claim 1 wherein said flexible shell is formed of an inner layer of soft pile material and an outer layer of wind and water resistant material.

3. Cover apparatus according to claim 1 wherein each of said pockets is defined by an inner wall portion of said shell and a flap, and including a rigid stay secured to said flap between said flap and said shell.

4. Cover apparatus according to claim 1 including a pair of slits intersecting said peripheral edge and formed parallel to one another for a common length, each said slit having a pair of side edges and including connection means on each pair of side edges for connecting respective pairs of said side edges together to close each respective slit whereby said shell is drawn taut around said frame element when both said slits are closed.

5. Cover apparatus according to claim 4 wherein each said connection means is defined by a zipper fastener.

6. Cover apparatus according to claim 4 wherein each said connection means is defined by matable hook and loop fasteners.

7. Cover apparatus according to claim 4 including a first reinforcement strap attached to said shell and extending transversely thereto between the ends of said slits opposite said peripheral edge, and a second reinforcement strap attached to said shell and extending between and across said slits adjacent said peripheral edge.

8. Cover apparatus according to claim 7 wherein the effective length of said second reinforcement strap is adjustable in length.

9. Cover apparatus according to claim 7 including a pouch member having a removable cover, said pouch member secured to said shell between said slits and extending from said peripheral edge to a location adjacent the ends of said slits opposite said peripheral edge.

10. Cover apparatus according to claim 9 wherein said pouch and said shell includes releasable attachment means for releasably securing said pouch to said shell.

11. Cover apparatus adapted to mount on a motorcycle gas tank having a plurality of downwardly projecting wings and having an upwardly oriented access opening at a mid portion thereof, the cover apparatus operative to protect the exterior surface of said tank and to provide storage space for a user of the motorcycle, comprising:

a flexible shell having an inner layer formed of a soft fabric material and an outer layer formed of a wear-resistant material, said shell configured to overlay said tank and contoured to the shape of said tank, said shell including an upper surface panel located across the top of said tank, a pair of side panels on either side of said tank, a forward edge at the front of said tank, and a rearward edge at the rear of said tank;

said shell having a pair of parallel, spaced apart, longitudinal slits formed in said upper surface panel, each said slit extending for a common length from said forward edge to a rearward location between said forward and rearward edges to define an access panel covering said access opening when said shell is positioned over said tank;

a plurality of pockets on said shell and positioned to receive respective ones of said wings;

fastening means on each said slit for selectively opening and closing each said slit whereby said shell is drawn tautly about said tank when said slits are closed;

a pouch member; and first and second matable mounting means on said access panel and said pouch member, respectively, said first and second mounting means connectable to one another for releasably securing said pouch member to said access panel.

12. Cover apparatus according to claim 11 including a forward reinforcement strap extending laterally adjacent said forward edge, between said side panels, across said slits, and underneath said access panel.

13. Cover apparatus according to claim 12 wherein said forward reinforcement strap is adjustable in length.

14. Cover apparatus according to claim 13 including a rearward reinforcement strap connected to said shell between said inner and outer layers from a first location adjacent the rearward end of one of said slits to a second location adjacent the rearward end of the other of said slits.

15. Cover apparatus according to claim 11 including first and second side pouch members, each said side pouch member having first attachment means and each said side panels having second attachment means, said first and second attachment means for selectively interconnecting one of said side pouch members to a respective side panel.

16. Cover apparatus according to claim 11 wherein said pouch member includes a removable pouch cover, said pouch cover having third mounting means complementary to and connectable to said first mounting means whereby said pouch cover may be selectably secured to one of said pouch member and said access panel.

17. Cover apparatus according to claim 16 including a plurality of said pouch members, each said pouch member having a removable pouch cover.

* * * * *